US007546585B2

(12) United States Patent
Ault

(10) Patent No.: US 7,546,585 B2
(45) Date of Patent: Jun. 9, 2009

(54) METHOD, SYSTEM AND COMPUTER PROGRAM PRODUCT FOR TESTING COMPUTER PROGRAMS

(75) Inventor: Donald F. Ault, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 598 days.

(21) Appl. No.: 11/041,630

(22) Filed: Jan. 24, 2005

(65) Prior Publication Data

US 2006/0168568 A1     Jul. 27, 2006

(51) Int. Cl.
 G06F 9/44       (2006.01)
 G06F 11/00      (2006.01)
(52) U.S. Cl. .................................. 717/124; 714/38
(58) Field of Classification Search ............... 717/124; 714/38
 See application file for complete search history.

(56) References Cited

U.S. PATENT DOCUMENTS

| 3,987,420 | A | * | 10/1976 | Badagnani ................ 717/131 |
| 4,525,780 | A | * | 6/1985 | Bratt et al. ................. 711/163 |
| 5,129,079 | A | * | 7/1992 | Miyashita .................. 712/211 |
| 5,151,987 | A | | 9/1992 | Abraham et al. |
| 5,632,032 | A | * | 5/1997 | Ault et al. .................. 718/100 |
| 5,729,554 | A | * | 3/1998 | Weir et al. ................. 714/739 |
| 5,758,061 | A | * | 5/1998 | Plum .......................... 714/35 |
| 5,892,949 | A | | 4/1999 | Noble |
| 6,067,639 | A | * | 5/2000 | Rodrigues et al. ............. 714/38 |
| 6,205,449 | B1 | | 3/2001 | Rastogi et al. |
| 6,247,023 | B1 | | 6/2001 | Hsiao et al. |
| 6,301,701 | B1 | * | 10/2001 | Walker et al. ............... 717/125 |
| 6,349,393 | B1 | * | 2/2002 | Cox ............................ 714/38 |

(Continued)

FOREIGN PATENT DOCUMENTS

JP       60254251 A  * 12/1985

OTHER PUBLICATIONS

Henriksen, James O, "An interactive debugging facility for GPSS", Dec. 1977, Winter Simulation Conference, Proceedings of the 9th conference on Winter simulation—vol. 1, pp. 330-338, http://delivery.acm.org/10.1145/810000/807556/p330-henriksen.pdf?key1=807556&key2=2219069911&coll=GUIDE&dl=GUIDE&CFID=10956441&CFTOKEN=54603292.*

(Continued)

*Primary Examiner*—Wei Y Zhen
*Assistant Examiner*—Chih-Ching Chow
(74) *Attorney, Agent, or Firm*—Cantor Colburn LLP; William Kinnaman, Jr.

(57) ABSTRACT

A method for testing computer programs including defining one or more selected force stop points for a target computer program. For each of the selected force stop points the target computer program is executed in a force stop mode and executed again in a non-force stop mode. Input to execution in the force stop mode includes the selected force stop point. The target program is terminated as a result of execution in the force stop mode when the selected force stop point has been reached. Executing in the force stop mode results in a residual environment. The target computer program is executed in a non-force stop mode in the residual environment. Output from executing in a non-force stop mode includes test result data. For each of the selected force stop points it is determined if the test result data is consistent with expected test results.

12 Claims, 3 Drawing Sheets

U.S. PATENT DOCUMENTS

| | | |
|---|---|---|
| 6,684,226 B1 | 1/2004 | Bodilsen |
| 6,687,847 B1 | 2/2004 | Aguilera et al. |
| 6,728,847 B1 | 4/2004 | Qin et al. |
| 6,823,497 B2 * | 11/2004 | Schubert et al. ................ 716/4 |
| 6,934,886 B2 * | 8/2005 | Ok .............................. 714/34 |
| 7,024,666 B1 * | 4/2006 | Brown ........................ 717/137 |
| 7,171,588 B2 * | 1/2007 | Friedman et al. .............. 714/38 |
| 7,203,926 B2 * | 4/2007 | Bogle et al. .................. 717/124 |
| 7,318,172 B2 * | 1/2008 | Lou ............................ 714/25 |
| 2003/0074177 A1 * | 4/2003 | Bowen ........................ 703/22 |
| 2004/0128585 A1 * | 7/2004 | Hind et al. .................... 714/38 |
| 2004/0205406 A1 * | 10/2004 | Kaliappan et al. ............. 714/31 |
| 2005/0177820 A1 * | 8/2005 | Mei et al. .................... 717/129 |
| 2005/0268195 A1 * | 12/2005 | Lund et al. .................. 714/741 |

OTHER PUBLICATIONS

Sorel et al., "A Dynamic Debugger for Asynchronous Distributed Algorithms", Jan. 1994, Software IEEE, vol. 11, pp. 69-76, http://ieeexplore.ieee.org/iel5/52/6427/00251213.pdf?tp=&isnumber=&arnumber=251213.*

"Perl Debugger Tutorial", May 12, 2004, pp. 1-5, http://web.archive.org/web/20040512122828/http://www.emunix.emich.edu/~evett/BioinformaticsTools/PerlDebugger.html.*

* cited by examiner

METHOD, SYSTEM AND COMPUTER PROGRAM PRODUCT FOR TESTING COMPUTER PROGRAMS

BACKGROUND OF THE INVENTION

The present disclosure relates generally to a method of testing computer programs and, in particular, to a method of testing computer programs that forces termination at specified points in the computer programs.

In computing systems, there are many system components and applications that create persistent objects (e.g., data sets, directories, files, file content, shared memory, semaphore sets, and message queues). Some persistent data objects only persist for the life of the initial program load (IPL), while others are hardened to a direct access storage device (DASD) and persistent across an IPL. Computer systems can become unusable for a variety of reasons including system errors, hardware problems and power outages. Computer applications, or programs, can be terminated unexpectedly due to programming error, terminating signals, operator cancel, etc. When a program that creates persistent data objects is interrupted due to any of the above computer system and/or computer application reasons, the persistent data objects left behind can be in an unpredictable state. When these applications are restarted after a system or application outage, they may fail to initialize properly due to the inconsistent state of the persistent data objects left behind after the last failure.

Some computer programs (also referred to herein as applications) provide a utility that will detect and delete all residual persistent data objects from a prior instance of the application. This always provides the computer program with a clean state to start from. This is generally acceptable when there is a single instance of the application, such that there is no consideration for other instances of the application running concurrently. Another approach to dealing with persistent objects is for the application to fail to restart after an abend, leaving it up to the user or system programmer to clean up any residual persistent data objects. This approach has drawbacks, because of the amount of knowledge required by the users of the program. In general, the more knowledge required by the user to clean up the residual objects, the less acceptable the product is to the user.

Another approach may be utilized by applications that have resources that persist for the life of the IPL. This approach requires the system to be re-IPLed (i.e., rebooted) in order to be able to start. For critical servers designed to operate continuously (i.e., 24/7), forcing a re-IPL is unacceptable and causes systems to miss their availability goals. A further approach is that some systems and applications are coded to cope with any residual data and to reuse the objects that are viable and delete those that are not. Depending on how many persistent data objects are involved and whether there can be multiple instances of the application trying to start at the same time, this logic to deal with an indeterminate state can be quite complex.

Computer programs that create and/or modify persistent objects should be tested to verify that the restart of the system or application functions as expected, regardless of where the previous instance of the application was interrupted. Often, the recovery flows are not fully tested and problems dealing with restart errors are frequently not detected for several years at which point it can be very difficult to debug and/or recreate the error. One approach to testing recovery of persistent objects is for programmers to modify the program to inject an error at a given point, recompile the program and execute the program to force the error. The programmer then removes the error injection code and recompiles again. This works for an initial test of the application, but the test is rarely repeated, even after significant programming changes are made to the module. It is also time consuming and error prone to constantly modify and recompile the program. In addition, programmers may utilize an interactive debugger to place breakpoints in a program to force a stopping point in the program. This can be very time consuming and is rarely repeated after the initial unit testing is completed.

An automated and easily repeatable method for testing computer programs that create persistent data objects would facilitate the testing of applications and would lead to higher quality application programs.

BRIEF SUMMARY OF THE INVENTION

Embodiments of the invention include a method for testing a computer program. The method includes defining one or more selected force stop points for a target computer program. For each of the selected force stop points the target computer program is executed in a force stop mode and executed again in a non-force stop mode. Input to execution in the force stop mode includes the selected force stop point. The target program is terminated as a result of execution in the force stop mode when the selected force stop point has been reached. Executing in the force stop mode results in a residual environment. The target computer program is executed in a non-force stop mode in the residual environment. Output from executing in a non-force stop mode includes test result data. For each of the selected force stop points it is determined if the test result data is consistent with expected test results.

Additional embodiments include a system for testing a computer program. The system includes a storage device and a host system in communication with the storage device. The host system includes instructions to implement a method including defining one or more selected force stop points for a target computer program located on the storage device. For each of the selected force stop points the target computer program is executed in a force stop mode and executed again in a non-force stop mode. Input to execution in the force stop mode includes the selected force stop point. The target program is terminated as a result of execution in the force stop mode when the selected force stop point has been reached. Executing in the force stop mode results in a residual environment. The target computer program is executed in a non-force stop mode in the residual environment. Output from executing in a non-force stop mode includes test result data. For each of the selected force stop points it is determined if the test result data is consistent with expected test results.

Further embodiments include a computer program product for testing computer programs. The computer program product includes a storage medium readable by a processing circuit and storing instructions for execution by the processing circuit for performing a method including defining one or more selected force stop points for a target computer program. For each of the selected force stop4 points the target computer program is executed in a force stop mode and executed again in a non-force stop mode. Input to execution in the force stop mode includes the selected force stop point. The target program is terminated as a result of execution in the force stop mode when the selected force stop point has been reached. Executing in the force stop mode results in a residual environment. The target computer program is executed in a non-force stop mode in the residual environment. Output from executing in a non-force stop mode includes test result data. For each of the selected force stop points it is determined if the test result data is consistent with expected test results.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION OF THE INVENTION

Exemplary embodiments of the present invention are utilized to test computer systems and applications that create persistent objects. Possible interruption points that have the potential for leaving a persistent resource in an unpredictable state are covered by the testing. A call to a macro or subroutine (called "force_stop") is added into portions of the program logic that create or modifies persistent data objects. Each location for a call to the force_stop macro is called a "force_stop_point" and is assigned a number. Additionally, a startup option is added to the program to allow a numbered force_stop_point to be identified via an input argument. When the force_stop macro gets control at a force_stop_point, it checks to see if this particular force_stop_point was specified via the input argument in the startup option. If it was, then the force stop macro terminates the execution of the program in an abrupt manner, simulating a failure. Subsequent restarting of the application without force_stop activated will allow the program to detect and handle each case where a persistent data object is missing.

For example, a program may have thirty force_stop_points. A programmer would then create a test script that loops through the thirty force_stop_points, starting the application with each force_stop_point activated, followed by another call to the program without the force_stop activated. So, with one test script, it is possible to test all initialization logic of the application and verify that it can recover from any failure during a prior initialization. Furthermore, this testing may be run repeatedly at low cost as additional logic is added to the program.

Figure 1:
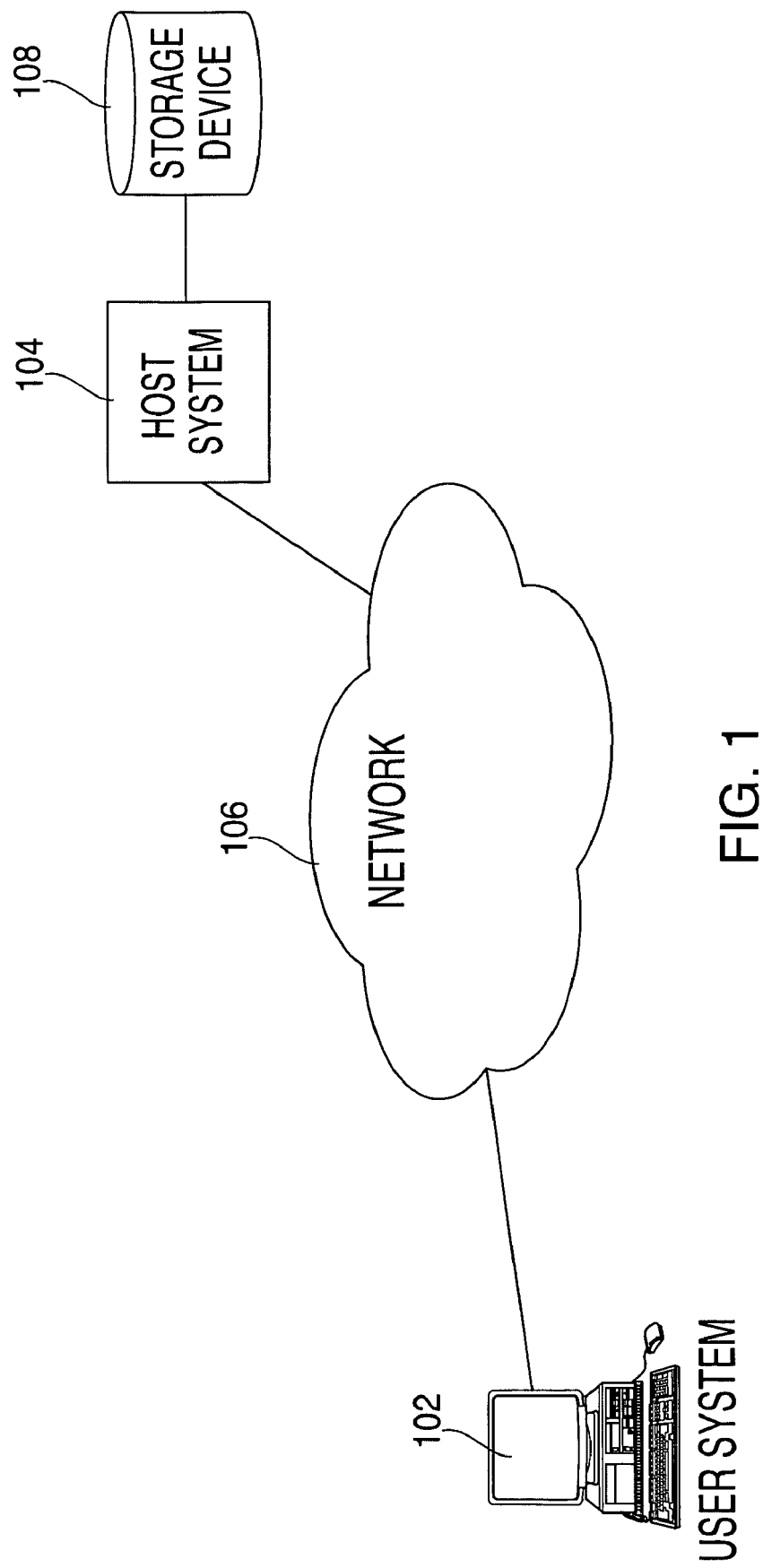
FIG. 1 is a block diagram of an exemplary system for testing computer programs.

FIG. 1 is a block diagram of a system for testing a computer program according to exemplary embodiments of the present invention. The system includes one or more user systems 102 through which users at one or more geographic locations may contact the host system 104 to test a computer program. In exemplary embodiments of the present invention, the host system 104 executes the program logic to produce test results. The user system 102 is coupled to the host system 104 via a network 106. Each user system 102 may be implemented using a general-purpose computer executing a computer program for carrying out the processes described herein. The user systems 102 may be personal computers (e.g., a lap top, a personal digital assistant) or host attached terminals. If the user systems 102 are personal computers, the processing described herein may be shared by a user system 102 and the host system 104 (e.g., by providing an applet to the user system 102) or contained completely on the user system 102. In exemplary embodiments of the present invention, the host system 104 is a personal computer and the processing described herein is performed by the personal computer.

The network 106 may be any type of known network including, but not limited to, a wide area network (WAN), a local area network (LAN), a global network (e.g. Internet), a virtual private network (VPN), and an intranet. The network 106 may be implemented using a wireless network or any kind of physical network implementation known in the art. A user system 102 may be coupled to the host system through multiple networks (e.g., intranet and Internet) so that not all user systems 102 are coupled to the host system 104 through the same network. One or more of the user systems 102 and the host system 104 may be connected to the network 106 in a wireless fashion.

The storage device 108 may be implemented using a variety of devices for storing electronic information. It is understood that the storage device 108 may be implemented using memory contained in the host system 104 or the user system 102 or it may be a separate physical device. The storage device 108 is logically addressable as a consolidated data source across a distributed environment that includes a network 106. Information stored in the storage device 108 may be retrieved and manipulated via the host system 104. The storage device 108 includes data such as the application program, the test script, and test results. The storage device 108 may also include other kinds of data such as information concerning the updating and creation of the test scripts. In exemplary embodiments, the host system 104 operates as a database server and coordinates access to application data including data stored on storage device 108.

The host system 104 depicted in FIG. 1 may be implemented using one or more servers operating in response to a computer program stored in a storage medium accessible by the server. The host system 104 may operate as a network server (e.g., a web server) to communicate with the user system 102. The host system 104 handles sending and receiving information to and from the user system 102 and can perform associated tasks. The host system 104 may also include a firewall to prevent unauthorized access to the host system 104 and enforce any limitations on authorized access. For instance, an administrator may have access to the entire system and have authority to modify portions of the system. A firewall may be implemented using conventional hardware and/or software as is known in the art.

The host system 104 may also operate as an application server. The host system 104 executes one or more computer programs to test computer programs. Processing may be shared by the user system 102 and the host system 104 by providing an application (e.g., java applet) to the user system 102. Alternatively, the user system 102 may include a standalone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

Figure 2:
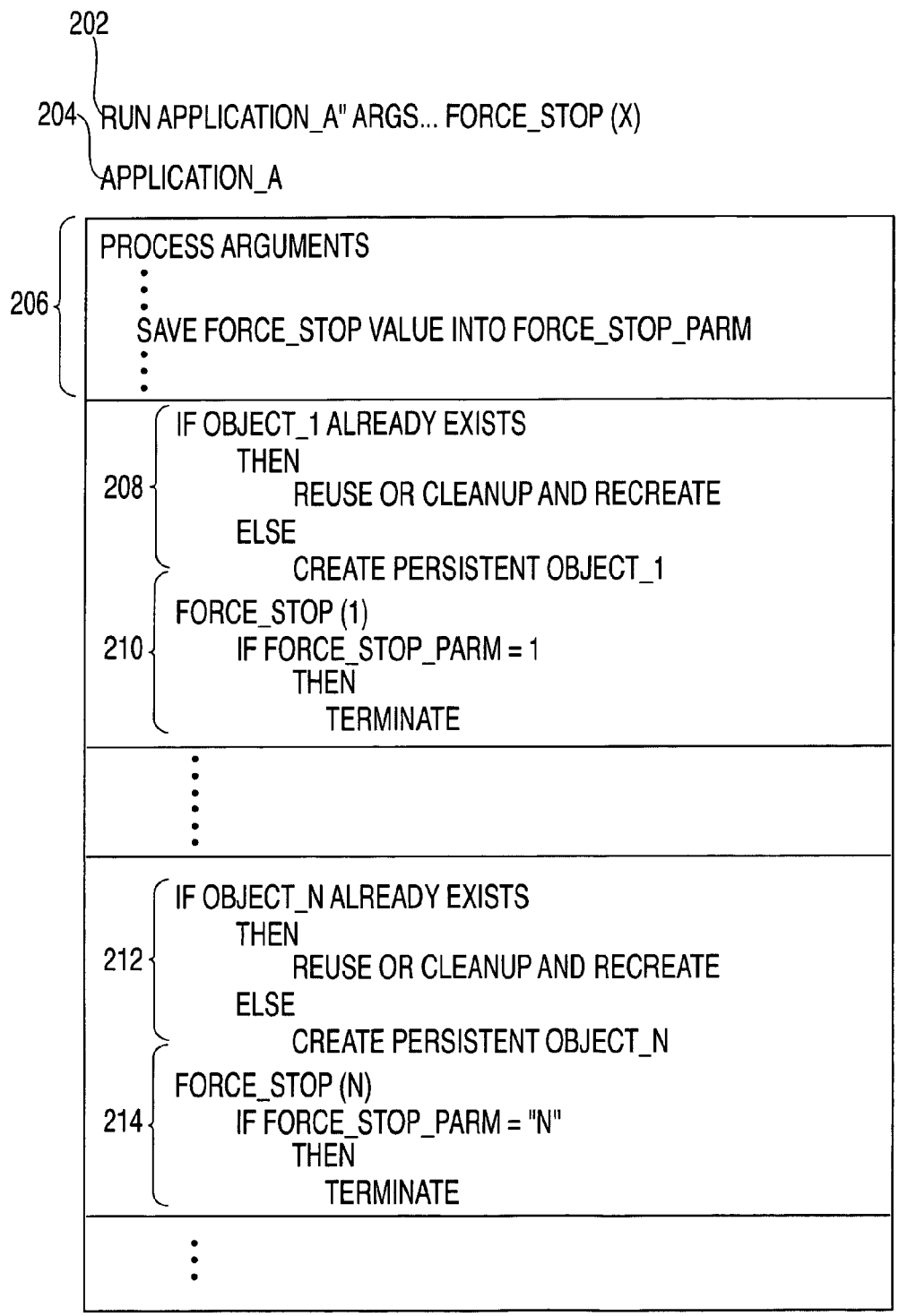
FIG. 2 is a block diagram of portions of a sample application that may utilize exemplary embodiments of the present invention.

FIG. 2 is a block diagram of portions of a sample application that may be tested utilizing exemplary embodiments of the present invention. Block 202 shows that application_a 204 is invoked with arguments, including a force_stop argument with the value "x." Application_a 204 is depicted in FIG. 2, with application_a 204 being an example of an application program that creates persistent data objects. At block 206, application_a 204 processes the input arguments. It recognizes the specification of a force_stop argument and stores the value ("x") of the force_stop argument into a local variable called "force_stop_parm." Application_a 204 then proceeds with its operation. In an exemplary embodiment of the present invention, if the value of the force_stop argument is zero (or any other value that doesn't correspond to a value of a force_stop point in the program) the application is executed in a non-force_stop mode resulting in no force_stop points being activated.

At block 208, application_a 204 includes instructions to create a persistent object, "object_1." First application_a 204 checks to see if object_1 is already present. If object_1 is already present, then block 208 must either delete object_1 or reuse object_1. If object_1 is not present or has now been cleaned up, block 208 creates object_1, a persistent data object.

At block 210, after creating object_1 at block 208, application_a 204 invokes the force_stop macro indicating that this is the first force_stop_point. The force_stop macro compares the value in the force_stop_parm with the value one. If the value of the force_stop_parm is one, then the values of the force_stop_parm and the force_stop_point are equal and the force_stop macro terminates application_a 204 by exiting, raising a signal, or any other means of termination. The net result is that application_a 204 has terminated after creating persistent object_1. The next time that application_a 204 is executed it will take the path to reuse or cleanup persistent data object_1 in block 208.

Application_a 204 then proceeds with its operation, creating persistent objects as needed. When application_a 204 gets to block 212 and is instructed to create persistent data object_n, it must first check to determine if object_n is already present. If object_n is already present, then block 212 must either delete object_n or reuse object_n. If object_n is not present or has now been cleaned up, block 212 creates object_n, a persistent data object.

At block 214, after creating object_n at block 212, application_a 204 invokes the force_stop macro indicating that this is the "nth" force_stop_point. The force_stop macro compares the value in the force_stop_parm with the value "n." If the value of the force_stop_parm is "n", then the values of the force_stop_parm and the force_stop_point are equal and the force_stop macro terminates application_a 204 by exiting, raising a signal, or any other means of termination. The net result is that application_a 204 has terminated after creating persistent object_n. The next time that application_a 204 is executed it will take the path to reuse or cleanup persistent data object_n in block 212.

Figure 3:
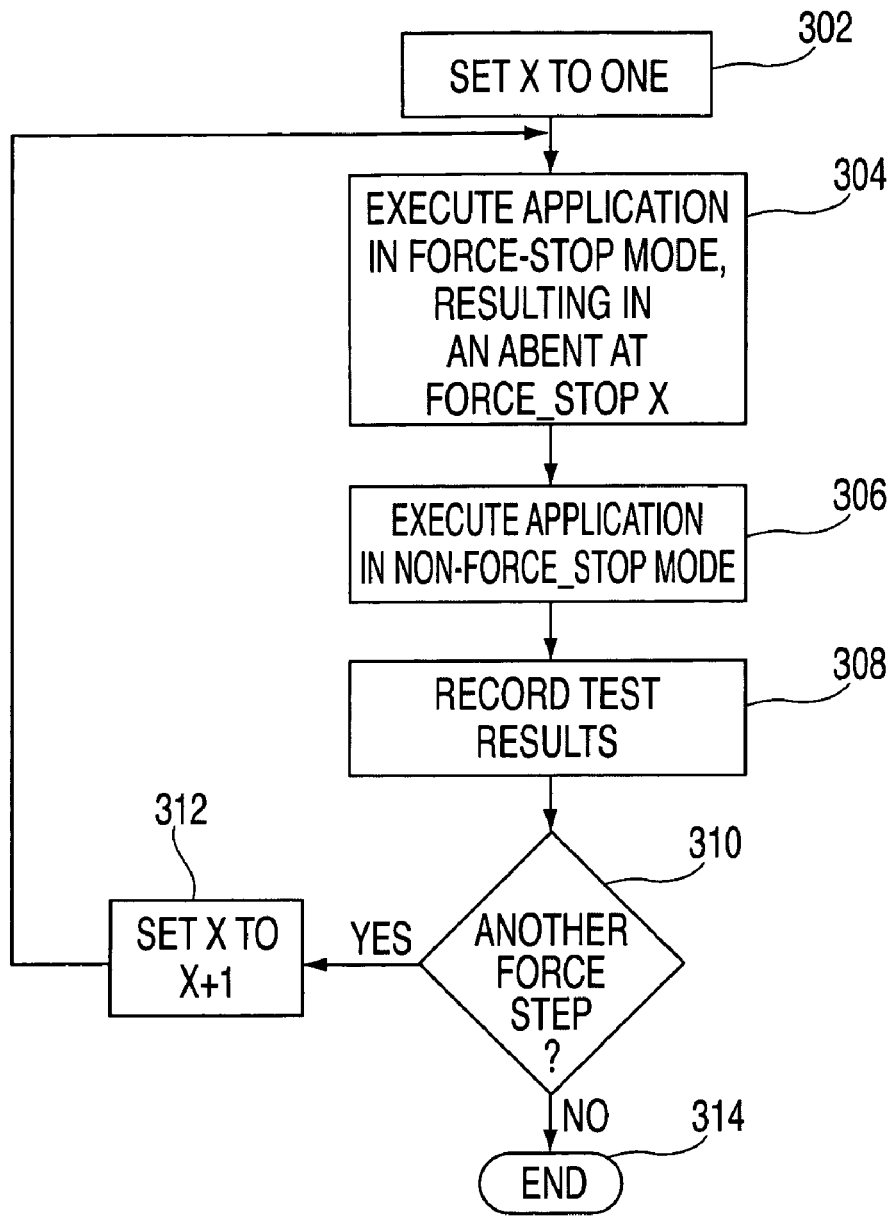
FIG. 3 is a process flow that may be implemented by exemplary embodiments of the present invention to test a computer program.

FIG. 3 is a process flow that may be implemented by exemplary embodiments of the present invention to test all of the recovery points of application_a 204 depicted in FIG. 2. FIG. 3 is a process flow of a test script that may be utilized to drive the recovery testing of application_a 204. Having completed the development of application_a 204, the developer knows how many force_stop_points are contained in application_a 204. At step 302, the force-stop argument is set to one. The application is executed in force_stop mode at step 304, resulting in an abend or terminate at the force_stop_point corresponding to the value in the force_stop argument and leaving a residual environment. The residual environment may contain one or more persistent objects. At step 306, the application is executed again in the residual environment without any forced abends, or in a non-force_stop mode (e.g., with a force_stop argument of zero where no force_stop_points in the application correspond to the value zero). At step 308, the test results are recorded. A determination about whether any other force_stop_points exist in the program is made at step 310. If more force_stop_points are contained in the program, then step 312 is performed and the value of the force_stop argument is incremented by one. Processing then continues at step 304. If there are no more force_stop points, as determined at step 310, then processing ends at step 314.

The net result of running the test script process depicted in FIG. 3 using application_a 204 is as follows. The first iteration through the loop starting at step 304 causes application_a 204 to proceed up to the point where persistent data object_1 is created. This first time through the code, it will be detected that object_1 does not exist and application_a 204 will create object_1. The force_stop in block 210 of FIG. 2 will detect that the force_stop_parm is a one, which corresponds to the force_stop point in block 210. Therefore, application_a 204 terminates, leaving a residual environment that includes persistent data object_1. The execution of application_a 204 in the residual environment at step 306, in a non-force_stop mode allows application_a 104 to get to the point in block 208 where it tests for the presence of object_1 and finds object_1 present. Application_a 204 then proceeds to cleanup or reuse object_1.

The next iteration of the loop starting at step 304 in FIG. 3 executes application_a 204 in force_stop mode with a force_stop value of two and then again in a non-force_stop mode. This continues up to the maximum number for the force_stop setting. At each iteration of the loop starting at step 304 in FIG. 3, application_a 204 first proceeds to create the persistent data object and on the subsequent invocation, detects that the presence of object_n and does the reuse or cleanup of object_n.

By running the test script depicted in FIG. 3, the user is able to quickly verify that the program successfully handles the processing of each persistent data object, whether it already exists or needs to be created. This script can be easily updated to handle the addition of new persistent data objects to the program. Exemplary embodiments of the present invention may be utilized to force all paths in a computer program and to verify failure recovery portions of the computer program.

Exemplary embodiments of the present invention may also be utilized for testing in general. If the programmer wants to test the behavior of the program when it terminates at any particular spot in the program (even if it doesn't involve a persistent data object), then the use of the force_stop macro will work equally as well.

Different force_stop macros are utilized depending on the language of the application program being tested and the methods utilized to terminate the program. For example, an assembler program may utilize an abend command to terminate an assembler program and other computer languages may utilize other commands such as exit and/or return. The force_stop macro includes a check of the force_stop_parm to see if it matches the number of the current force_stop_point. If the two are found to be equal, the force_stop macro terminates the program.

In exemplary embodiments of the present invention, the force_stop macro code remains in the application during both testing and production implementation. During testing, the application executes in a force_stop mode in response to the force_stop argument containing a value corresponding to one of the force_stop_points. During production, the application executes in a non-force_stop mode in response to the force_stop argument containing a zero or some other value that does not correspond to a force_stop_point in the application. In alternate exemplary embodiments, the force_stop macros are removed from the application prior to production implementation.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for testing computer programs, the method comprising:
    defining one or more force stop points for a target computer program, wherein the force stop points are included in the target computer program;
    selectively activating one or more of the one or more force stop points as one or more selected force stop points in response to receiving one or more arguments for interpretation by the target computer program, the one or more arguments identifying the one or more force stop points to activate while executing the target computer program; and
    for each of the selected force stop points:
        executing the target computer program in a force stop mode wherein the executing in the force stop mode results in the target computer program terminating when the selected force stop point has been reached and the executing in the force stop mode results in a residual environment;
        executing the target computer program in a non force stop mode in the residual environment, wherein output from the executing in the non force stop mode includes test result data; and
        determining if the test result data is consistent with expected test results.

2. The method of claim 1 wherein the target computer program creates a persistent object.

3. The method of claim 1 wherein the target computer program creates or modifies a persistent object.

4. The method of claim 1 wherein the target computer program creates or modifies one or more persistent objects with each of the selected force stop points corresponding to one of the persistent objects.

5. The method of claim 1 wherein the target computer program includes a force stop macro that performs the terminating when the target computer program is executed in the force stop mode.

6. The method of claim 1 wherein the target computer program is executed in the force stop mode when the selected force stop point corresponds to a target computer program force stop point located in the target computer program.

7. The method of claim 1 wherein the terminating occurs after a persistent object is accessed, modified or created in the target computer program.

8. The method of claim 1 wherein the terminating is in response to an abend command.

9. The method of claim 1 wherein the terminating is in response to an exit command.

10. The method of claim 1 wherein the terminating is in response to a return command.

11. The method of claim 1 wherein the one or more selected force stop points are reached after the target computer program creates or modifies one or more persistent objects, leaving one or more newly created or modified persistent objects in the residual environment, thereby establishing a test condition wherein a recovery path of the target computer program is tested upon executing the target computer program in the non-force stop mode in the residual environment.

12. The method of claim 11 wherein execution of the target computer program is restarted from the beginning of the target computer program after each of the one or more selected force stop points are reached and the one or more arguments are modified to change the one or more selected force stop points.

* * * * *